United States Patent [19]

Meeks

[11] Patent Number: 4,537,432
[45] Date of Patent: Aug. 27, 1985

[54] SECURITY SEALS

[75] Inventor: Alan M. G. Meeks, Chineham, England

[73] Assignee: ITW Limited, Windsor, England

[21] Appl. No.: 423,754

[22] Filed: Sep. 27, 1982

[30] Foreign Application Priority Data

Sep. 30, 1981 [GB] United Kingdom ............... 8129525
Feb. 18, 1982 [GB] United Kingdom ............... 8204824

[51] Int. Cl.³ .............................................. B65D 33/34
[52] U.S. Cl. ................................. 292/318; 24/16 PB; 24/30.5 P; 292/322
[58] Field of Search .............. 24/16 R, 16 PB, 20 TT, 24/30.5 R, 30.5 W, 30.5 P, 206 A, 17 AP, 30.5 A; 292/307 R, 307 A, 307 B, 317, 318, 319, 320, 321, 322; 248/74.5

[56] References Cited

U.S. PATENT DOCUMENTS

| 736,024 | 8/1903 | Russell | 292/307 R |
|---|---|---|---|
| 1,380,038 | 5/1921 | Brooks | 292/317 |
| 1,416,683 | 5/1922 | Brooks | 292/307 R |
| 1,830,950 | 11/1931 | Lake | 292/319 |
| 2,913,274 | 11/1959 | Brooks et al. | 292/317 |
| 2,977,145 | 3/1961 | Rifkin | 292/321 |
| 3,488,813 | 1/1970 | Kohke | 24/16 PB |
| 3,718,355 | 2/1973 | Canter | 24/16 PB X |
| 3,748,697 | 7/1973 | Marchese et al. | 24/20 TT X |
| 4,001,919 | 1/1977 | Moberg et al. | 292/318 X |
| 4,263,697 | 4/1981 | Speedie | 24/206 A X |
| 4,424,994 | 1/1984 | Dowden | 292/318 |
| 4,470,173 | 9/1984 | Adamson | 24/17 AP X |

Primary Examiner—William E. Lyddane
Assistant Examiner—James R. Brittain
Attorney, Agent, or Firm—J. R. Halvorsen; T. W. Buckman

[57] ABSTRACT

A one-piece plastics security seal, of the kind having a flexible strap securable within a passageway in a housing, may include a new locking arrangement and/or a new release arrangement.

In the locking arrangement, the strap carries a series of teeth of non-rectangular outline, when viewed along the length of the strap, with at least a part of the passageway having an outline complementary to that of the strap and the teeth carried thereby, and the passageway being offset along its length in the region of a resiliently deformable stop for permitting movement of the teeth through the passageway in one direction, but not the other.

In the release arrangement, the flexible strap and also a tab both extend generally transversely to the housing, with the strap being connected to the tab and the tab being frangibly connected to the housing.

The locking arrangement is difficult to open, without causing visible damage, but is nevertheless easy to manufacture, and the release arrangement is easier to operate than if the strap had been frangibly connected directly to the housing.

8 Claims, 9 Drawing Figures

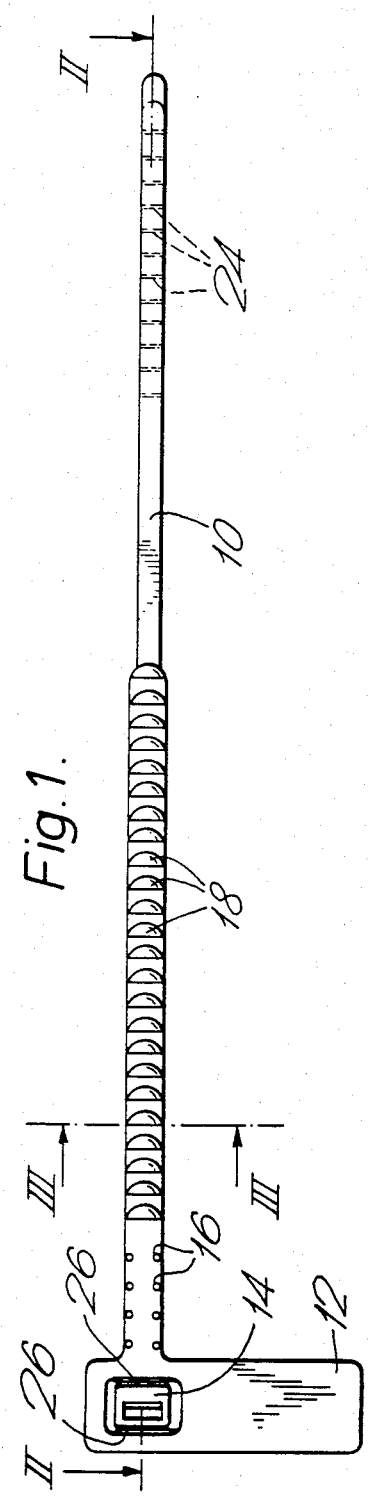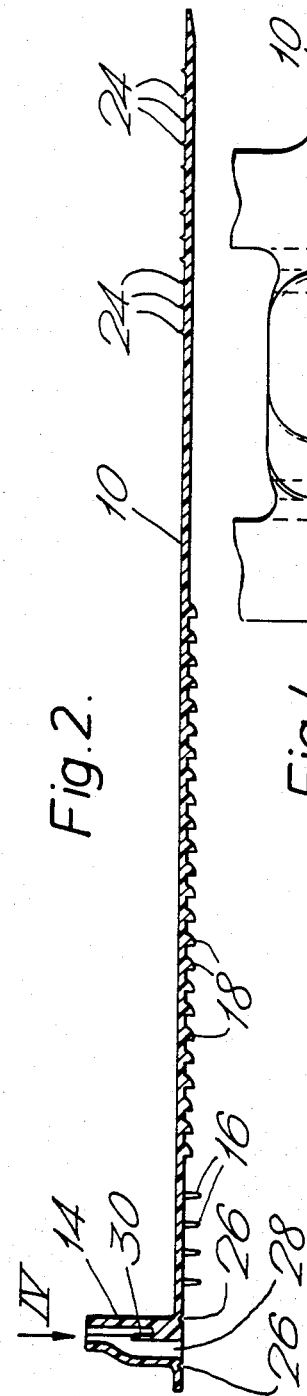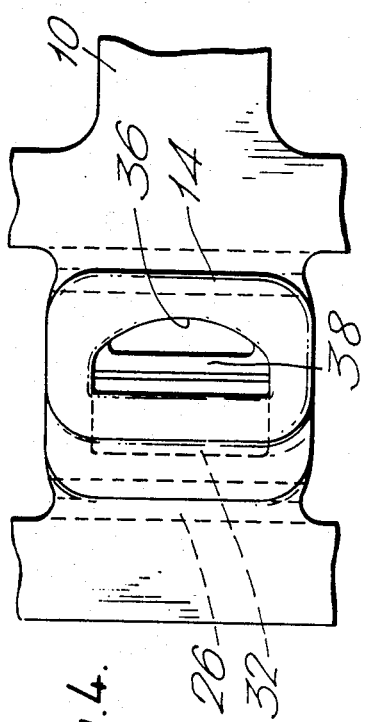
Fig.1.
Fig.2.
Fig.3.
Fig.4.

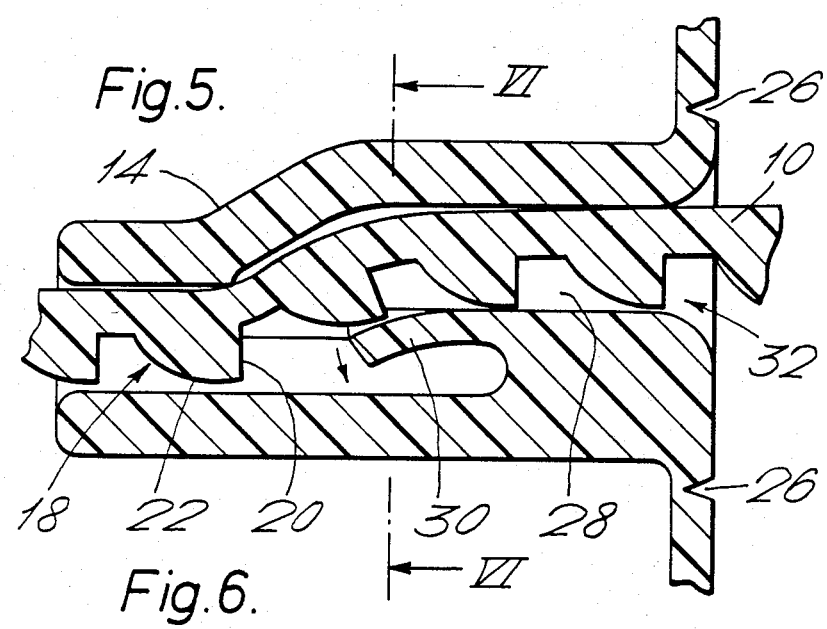
Fig. 5.
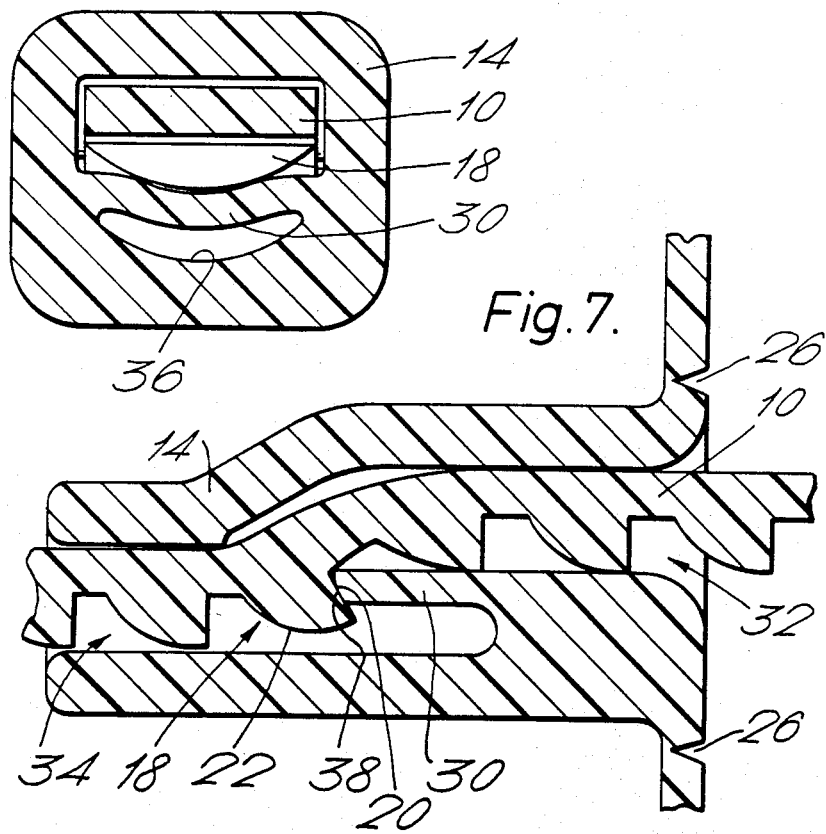
Fig. 6.
Fig. 7.

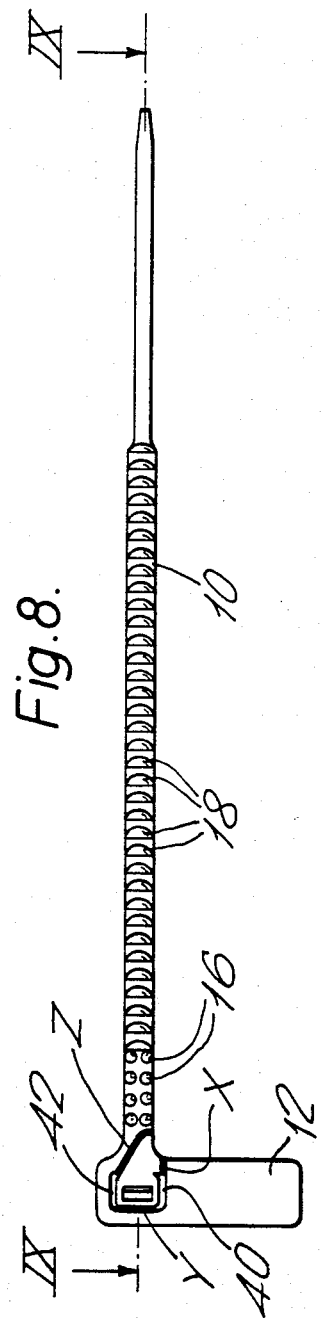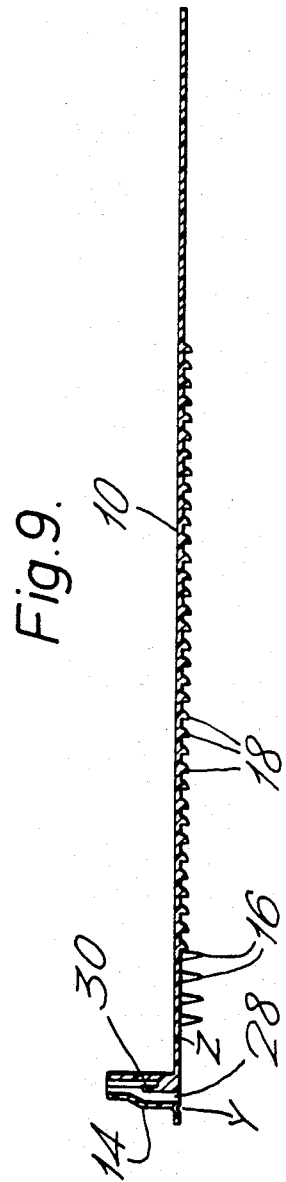

SECURITY SEALS

The present invention is concerned with security seals of the kind that may be secured tightly around the necks of cash bags, for example, to act as seals which must be broken before the cash bags can be opened.

Many proposals have been made for deterring theft by the use of such security seals.

It is known, by providing portions of extreme weakness, to make a security seal so sensitive that it immediately breaks when tampered with by a thief. However, the problem is that it may also break merely as a result of rough handling, and it may not then be possible to establish the time and place of any subsequent theft. On the other hand, if the security seal is not so sensitive, its removal by authorised personnel may be awkward or even difficult without special equipment.

A first aim has thus been to provide a security seal which, while maintaining an ability to break during any deliberate attempt at removal, is unlikely to break accidentally in use, yet after use can be readily removed by hand in a particularly simple and easy manner.

According to a first aspect of the present invention a security seal comprises a housing having a passageway therein, a tab extending generally transversely to the housing, and a flexible strap extending generally transversely to the housing, with the strap being connected to the tab and the tab being frangibly connected to the housing, whereby removal of the housing leaves the strap still connected to the tab.

The advantage of this arrangement is that, during removal, it is not necessary to hold the strap to stop it twisting. This would be difficult if the strap is lying tightly against the neck of a cash bag yet would be necessary if the strap had been frangibly connected directly to the housing. Instead, it is merely necessary to move the tap with respect to the housing to exert a significant leverage on, and thus readily break, the frangible connection between the tab and the housing.

As well as the above-described conflicting requirements with regard to breaking of the security seal, there are other conflicting requirements with regard to the complexity of means for locking the security seal.

If the locking means is too simple and accessible there is an unacceptable risk that a thief could use a blade or other tool to open the locking means. This would permit undetectable removal of the security seal and access to any valuables protected by the security seal. On the other hand, if the locking means is too complex and shilded there are increased manufacturing difficulties leading to unacceptable additional expense.

A second aim has thus been to provide a security seal which has locking means that is extremely difficult to open, without causing visible damage, but is nevertheless extremely easy to manufacture, resulting in the twin benefits of cheapness and reliability.

According to a second aspect of the present invention, a security seal comprises a housing and a flexible strap which is secured at one end with respect to the housing with the other end of the strap being receivable by a passageway extending through the housing, the strap carrying a series of teeth of non-rectangular outline, when viewed along the length of the strap, with at least a part of the passageway having an outline complementary to that of the strap and the teeth carried thereby, and the passageway being offset along its length in the region of a resiliently deformable stop for permitting movement of the teeth through the passageway in one direction, but not the other.

It will be appreciated that the specially shaped teeth, the specially shaped passageway and the resiliently deformable stop together constitute simple yet secure locking means.

Preferably, of course, a security seal in accordance with the present invention incorporates both of the sets of features defined hereinabove.

Indeed, the security seal is preferably so arranged that the flexible strap extends generally transversely to both the tab and the housing.

The tab may be frangibly connected to the housing by two lines of reduced thickness. More particularly, the tab can be regarded as presenting a single aperture, with the housing bridging just a central part of said aperture to leave a pair of spaced-apart end openings. The lines of reduced thickness may extend directly between said pair of spaced-apart end openings and isolate the housing therebetween.

It has also been found, however, that the action of tearing and releasing the security seal is very much easier if one of the lines of reduced thickness is replaced by two further lines of reduced thickness, each connecting one of the spaced-apart end openings to a peripheral location on the security seal.

Preferably, the two further lines of weakness are located closer to the strap than the remaining line of weakness from the original example. Also preferably, both of the two further lines of weakness open to the periphery of the security seal on the same side of the strap, considered with respect to the length of the strap. Preferably, all three lines of weakness are formed by grooves extending into the same face of the tab.

Two security seals, in accordance with the present invention, will now be described, by way of example only, with reference to the accompanying drawings, in which:

FIG. 1 is a plan view of the first security seal in its as-molded condition;

FIGS. 2 and 3 are cross-sectional views taken along the lines II—II and III—III respectively of FIG. 1;

FIG. 4 is an enlarged fragmentary end view taken in the direction of the arrow IV of FIG. 2;

FIG. 5 schematically illustrates the action of the teeth on the strap with the stop in the housing of the first security seal prior to locking;

FIG. 6 is a cross-sectional view taken along the line VI—VI of FIG. 5;

FIG. 7 schematically illustrates the action of the teeth on the strap with the stop in the housing of the first security seal at the moment of locking;

FIG. 8 is a plan view of the second security seal in its as-moulded condition; and FIG. 9 is a cross-sectional view taken along the line IX—IX of FIG. 8.

Referring initially to FIGS. 1 to 7, a first security seal is shown in accordance with the present invention. The security seal may be integrally molded of a plastics material such as polypropylene which is resistant to repair by adhesives. The security seal as shown includes a flexible strap 10, a tab 12, and a housing 14.

The strap 10 is formed as a generally rectangular strip extending generally transversely to both the tab 12 and the housing 14. The strap 10 has three sections. The section closest to the tab 12 has several spikes 16 projecting therefrom for use in gripping the neck of a cash bag and holding the security seal in position. A central section of the strap 10 carries a series of teeth 18 of curved outline when viewed along the length of the strap. Each of the teeth 18 has a flat face 20 and a part-spherical face 22 which act as a ratchet. The section furthest from the tab 12, at the free end of the strap 10, has ribbed finger grips 24.

The strap 10 is connected to the tab 12 without any area of weakening. The tab 12 is frangibly connected to the housing 14, however, at two lines 26 of reduced thickness of the plastics material. An identification number or other reference (not shown) may be molded or otherwise displayed on the tab 12.

The housing 14 is formed as a generally rectangular body extending generally transversely to both the strap 10 and the tab 12. A passageway 28 extends through the housing 14—the passageway 28 being offset along its length in the region of a resiliently deformable stop 30. An entrance part 32 of the passageway is of rectangular outline but an exit part 34 of the passageway has an outline complementary to that of the strap 10 and the teeth 18 carried thereby. The exit part 34 of the passageway is thus defined in part by a concave surface 36 matching the convex outline of the part-spherical surfaces 22 of the teeth 18. The stop 30, which is in the form of a plate of uniform thickness having a chamfered end 38, can be regarded as being located longitudinally between the entrance and exit parts of the passageway 28. The longitudinally extending transverse edges of the stop 30 may be rigidly connected to the adjacent sides of the housing 14. Indeed, provided it was possible to pull the strap through the housing by making the housing sufficiently resilient, the stop 30 need not be in the form of a plate protruding into the passageway 28, but could be in the form of a rigid tooth.

In use, the security seal is wrapped tightly around the neck of a cash bag.

More particularly, the housing 14 is held against the neck of the cash bag and the free end of the strap 10 is wrapped loosely around the neck of the cash bag before being inserted into the entrance part 32 of the passageway 28. The strap 10 is then fed through the passageway 28 until the free end of the strap 10 emerges from the exit part 34 of the passageway 28. By grasping the finger grips 24 on the free end of the strap 10 and pulling, the strap 10 is tightened around the neck of the cash bag, causing the spikes 16 to penetrate or at least grip the material of the cash bag.

During this tightening operation, some of the teeth 18 are pulled past the stop 30 in the passageway 28 with a ratchet action. Each time that the stop 30 is passed by one of the teeth 18, the stop 30 is first deflected by the part-spherical face 22 of said tooth (FIGS. 5 and 6), before the stop 30 snaps back to its original position and the chamfered end 38 of the stop 30 abuts the flat face 20 of said tooth (FIG. 7). The strap 10 can thus be moved through the passageway 28 only in the direction tending to tighten the security seal around the neck of the cash bag but not in the other direction.

It is now extremely difficult even to gain access to the stop 30 because the exit part 34 of the passageway 28 is blocked by the strap 10 and the teeth 18. The presence of the cash bag prevents access to the stop 30 from the entrance part 32 of the passageway 28. Even if a thin curved blade is inserted into the passageway 28, from either direction, that blade cannot then be deformed in a different plane to cause the stop 30 to take up the curved outline of the teeth 18. Naturally, both the entrance part 32 and the exit part 34 of the passageway 28 should be as long as is conveniently possible. It is still extremely easy for authorised personnel to remove the security seal, however, because it is merely necessary for the tab 12 to be pulled away from the cash bag. This tears the frangible connection between the tab 12 and the housing 14 at the lines 26 of reduced thickness of the plastics material.

Referring now to FIGS. 8 and 9, a second security seal is shown in accordance with the present invention. The second security seal is so similar to the first security seal that a full discussion will not be necessary. The differences in the second security seal are as follows:

(a) the free end of the strap 10 no longer has finger grips but instead has a sparked finish;
(b) the spikes 16 are more pronounced; and
(c) that line of reduced thickness closer to the strap 10 has been replaced by two further lines of reduced thickness.

There are thus now three lines of weakness viz. X connecting end opening 40 to a peripheral part of the tab 12, Y connecting end opening 40 to end opening 42, and Z connecting end opening 42 to a peripheral part of the tab 12 at its junction with the strap.

In use, which is essentially as described hereinbefore with reference to the first security seal, the tab 12 is twisted around its longitudinal axis to tear X, is then manipulated to tear Y, and is finally pulled back on itself to tear Z, thereby releasing the housing 14.

It will be appreciated that the second security seal may but need not necessarily incorporate the specially shaped teeth 18, the specially shaped passageway 28 and the resiliently deformable stop 30 of the first security seal.

Indeed, security seals with either of the abovedefined tab release arrangements need not incorporate any features at all of the non-rectangular tooth locking arrangement and vice versa. The flexible strap may thus alternatively be securable within the passageway by other standard locking means if the new release means is utilised. Conversely, the flexible strap may thus alternatively be removable by other standard release means if the new locking means is utilised.

I claim:

1. A one-piece plastic security seal comprising a housing having a passageway therein, a tab extending generally transversely to the housing, and a flexible strap extending generally transversely to the housing, with the strap being connected to the tab and the tab being frangibly connected to the housing by at least a first and a second lines of reduced thickness, said tab including a single aperture with said housing bridging just a central part of said aperture to leave a pair of spaced-apart end openings on opposite sides of said housing, at least said first of said lines of reduced thickness extending directly between said pair of spaced-apart end openings on the side of said housing opposite sand strap.

2. A security seal according to claim 1 wherein said seal includes a third line of reduced thickness whereby one of said second and third lines of reduced thickness is connected to and extends from one of the spaced-apart end openings to a peripheral location on the security seal and the other of said second and third lines is connected to and extends from the other end opening to a peripheral edge of said seal.

3. A security seal according to claim 2 wherein said second and third lines are located closer to said strap than is said first line of weakness.

4. A security seal according to claim 3 wherein said second and third lines extend substantially to the periphery of the security seal on the same side of the strap, considered with respect to the length of the strap.

5. A security seal according to claim 2, in which all three lines of weakness are formed by grooves extending into the same face of the tab.

6. A one-piece plastic security seal comprising a housing and a generally flat flexible elongated strap fixed at one end with respect to said housing, said strap having one surface generally flat while its opposite surface carries a plurality of spaced teeth of non-rectangular outline when viewed along the length of said strap, at least one of said teeth having a highpoint on a cam-like surface terminating in cooperative abrupt shoulder means, said highpoint of said tooth being spaced inwardly from the lateral edges of said elongated strap, said housing including a through bore passageway having an ingress opening for accepting the free opposite end of said strap and an outline generally complimentary to said strap and the teeth carried thereon, said passageway including a bend intermediate its length whereby the ingress and egress of said passageway are offset at opposite ends of said housing, a deflectable plate-like stop extending substantially axially in said passageway intermediate the length of the passageway and having its side edges connected to opposite walls of said passageway, said platelike stop having a free end edge positioned in the vicinity of said bend whereby a portion of said stop spaced inwardly from the connected side edges is adapted to deflect when confronted by at least one of said teeth having a highpoint on a cam surface, said abrupt shoulder means adapted to engage said free end edge of said deflected stop in sequential fashion during adjustment of said strap relative to said housing, said strap having adequate length to insure that in the operative state there is more than one tooth in the passageway on either side of said stop and said bend in the passageway whereby pilferage through external manipulation are virtually eliminated.

7. A security seal of the type according to claim 6 wherein a manually grippable tab extends generally transversely to said housing, said flexible strap being connected to said tab and said tab being frangibly connected to said housing, whereby removal of the housing by rupture of the frangible connection leaves the strap still connected to the tab and the opposite end of the flexible strap being secured with respect to the housing, thereby disengaging the strap and permitting its removal from the workpiece it has sealed.

8. A security seal according to claim 6, in which each of the teeth has a part-spherical surface defining a convex outline.

* * * * *